United States Patent
Hemphill et al.

(10) Patent No.: US 7,757,829 B2
(45) Date of Patent: Jul. 20, 2010

(54) FRICTIONALLY GUIDED RADIAL ONE-WAY CLUTCH

(75) Inventors: Jeffrey Hemphill, Copley, OH (US);
Philip George, Wooster, OH (US);
James Habegger, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 444 days.

(21) Appl. No.: 11/811,809

(22) Filed: Jun. 12, 2007

(65) Prior Publication Data

US 2007/0284210 A1 Dec. 13, 2007

Related U.S. Application Data

(60) Provisional application No. 60/813,150, filed on Jun. 13, 2006.

(51) Int. Cl.
*F16D 33/00* (2006.01)
*F16D 41/063* (2006.01)
(52) U.S. Cl. .................. 192/45.1; 60/345; 192/41 R; 192/46; 192/53.1
(58) Field of Classification Search ............ 60/345; 192/39
See application file for complete search history.

(56) References Cited

U.S. PATENT DOCUMENTS

| | | | | | |
|---|---|---|---|---|---|
| 3,300,003 | A | * | 1/1967 | Peterson et al. | 192/46 |
| 4,164,130 | A | * | 8/1979 | Hammer | 192/46 |
| 6,148,979 | A | * | 11/2000 | Roach et al. | 192/45.1 |
| 6,539,825 | B1 | * | 4/2003 | Lin | 81/60 |
| 7,044,029 | B1 | * | 5/2006 | Hopper et al. | 81/60 |
| 2003/0213342 | A1 | * | 11/2003 | Wu | 81/60 |
| 2007/0045076 | A1 | | 3/2007 | Brees et al. | |
| 2007/0137977 | A1 | | 6/2007 | Peri et al. | |
| 2007/0220874 | A1 | | 9/2007 | Hemphill et al. | |
| 2007/0220876 | A1 | | 9/2007 | Brees | |
| 2007/0220877 | A1 | | 9/2007 | George et al. | |
| 2007/0224042 | A1 | | 9/2007 | Brees et al. | |
| 2008/0053784 | A1 | * | 3/2008 | Davis | 192/41 A |
| 2008/0149447 | A1 | * | 6/2008 | Davis | 192/45.1 |

* cited by examiner

*Primary Examiner*—Rodney H Bonck
(74) *Attorney, Agent, or Firm*—Simpson & Simpson, PLLC

(57) ABSTRACT

The present invention broadly comprises a radial one-way clutch for an automotive device, including: a first annular element; a second annular element arranged for rotational connection to a torque transmitting element in the device; at least one engagement element radially disposed between the first and second annular elements and having at least one first interlocking feature; and an annular frictional element frictionally engaged with the engagement element. One of the first and second annular elements includes at least one second interlocking feature and is rotationally locked with the frictional element. In a first rotational direction, the frictional engagement urges the engagement element to radially displace to engage the interlocking features to rotationally connect the first and second annular elements. In a second rotational direction, the frictional engagement is arranged to urge the engagement element to radially displace such that the first and second annular elements are rotationally independent.

25 Claims, 14 Drawing Sheets

US 7,757,829 B2

FRICTIONALLY GUIDED RADIAL ONE-WAY CLUTCH

CROSS-REFERENCE TO RELATED APPLICATIONS

This application claims the benefit under 35 U.S.C. §119(e) of U.S. Provisional Application No. 60/813,150 filed Jun. 13, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a radial one-way clutch. Even more specifically, the invention relates to a radial one-way clutch for a stator in a torque converter using friction to guide the engagement process.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs to be redirected, and the one-way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis.

Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Modern automotive design creates constant pressure to reduce the size of torque converters, in particular, the axial length of a torque converter. As well, the increasingly competitive nature of the automotive market demands that the complexity and cost of torque converter components be reduced at every opportunity. An intermediary element(s) in a one-way clutch must sustain the torque delivered by the rotating element of the clutch. For example, for a clutch with a rotating member and a fixed member; to sustain the torque, the intermediary element(s) must have a certain amount of surface area in contact with, the rotating and fixed members of the clutch. It is known to use roller or sprag clutches for a one-way clutch. The rollers are axially aligned and the relatively small portion of the rollers in contact with the clutch races must be designed to bear the force associated with the operation of the clutch, particularly in the locked mode. Unfortunately, to account for the forces, the axial length of the rollers must be made relatively long, increasing the axial width of the clutch. Also, roller and sprag clutches are relatively complex and include a large number of precision elements.

Thus, there is a long-felt need for a one-way clutch for a stator in a torque converter having a reduced axial length and using more cost-effective components and processes.

BRIEF SUMMARY OF THE INVENTION

The present invention broadly comprises a radial one-way clutch for an automotive device, including: a first annular element; a second annular element arranged for rotational connection to a torque transmitting element in the automotive device; at least one engagement element radially disposed between the first and second annular elements and having at least one first interlocking feature; and an annular frictional element frictionally engaged with the at least one engagement element. One of the first and second annular elements includes at least one second interlocking feature and is rotationally locked with the annular frictional element. In a first rotational direction, the frictional engagement is arranged to urge the at least one engagement element to radially displace to engage the at least one first and second interlocking features to rotationally connect the first and second annular elements. In a second rotational direction, the frictional engagement is arranged to urge the at least one engagement element to radially displace such that the first and second annular elements are rotationally independent.

In some aspects, in the first direction, the frictional contact is arranged to urge the at least one engagement element radially inward and in the second direction, the frictional contact is arranged to urge the at least one engagement element radially outward. In some aspects, in the first direction, the frictional contact is arranged to urge the at least one engagement element radially outward and in the second direction, the frictional contact is arranged to urge the at least one engagement element radially inward.

In some aspects, the second element is arranged to transmit a force in the first direction, and the frictional contact is arranged to absorb at least a portion of the force. In some aspects, the at least one engagement element comprises an area arranged to engage one of the first and second annular elements, and a circumferential extent of the area is greater than an axial extent of the area. The second interlocking feature is formed complimentarily with respect to the first interlocking feature. In the first rotational direction, the at least one first and second interlocking features are arranged to matingly engage to rotationally lock the one of the first and second annular elements and the at least one engagement element. In the second direction, the at least one first and second interlocking feature are free of contact.

In some aspects, the first interlocking feature includes one of a radial protrusion or radial recess and the second interlocking feature includes the other of the radial protrusion or the radial recess. In some aspects, the device includes fluid disposed between the at least one first and second interlocking features, and one of the at least one first and second interlocking features is arranged to displace the fluid. Then, the second element is arranged to transmit a force in the first direction, and the displacement of the fluid is arranged to absorb at least a portion of the force. In some aspects, the clutch includes first and second side plates disposed on opposite radial sides of the engagement element and arranged to at least partially contain the fluid between the at least one first and second interlocking features.

In some aspects, one of the first or second annular elements includes at least one circumferential surface tapering radially toward the first interlocking features in the second direction. In the first direction, the frictional engagement causes the at least one engagement element to slide along the circumferential surface, and the circumferential surface is arranged to urge the at least one engagement element radially toward the first interlocking features.

In some aspects, the clutch includes at least one first biasing element connected to the at least one engagement element and urging the at least one engagement element radially outward. In some aspects, in the second direction, the at least one engagement element is arranged to slide along the circumferential surface to disengage from the first interlocking features. In some aspects, the second element is arranged to transmit energy in the first direction and the at least one engagement element is elastically deformable to absorb at least a portion of the energy.

In some aspects, the second element is arranged to transmit energy in the first direction, the at least one engagement element includes first and second engagement elements connected by at least one elastically deformable element, and the at least one elastically deformable element is arranged to absorb at least a portion of the energy. In some aspects, the clutch includes an annular elastically deformable element in contact with the first and second engagement elements and applying axial pressure to the first and second engagement elements.

In some aspects, the second element is arranged to transmit a force in the first rotational direction and the second element is arranged to apply the force to the at least one engagement element in a substantially circumferential direction. In some aspects, the at least one engagement element is rotationally connected to the second annular element. In some aspects, the first annular element is non-rotatable or rotatable.

The present invention also broadly comprises a radial one-way clutch in a stator for a torque converter, including a hub for the stator, the hub including at least one radial protrusion; an annular element rotationally connected to blades for the stator; an annular frictional element rotationally locked with the hub; and at least one elastically deformable engagement element radially disposed between the hub and annular element, rotationally connected to the annular element, frictionally engaged with the frictional element, having at least one radial recess, and preloaded in a first radial direction. In the first rotational direction, the frictional engagement urges the at least one engagement element radially inward so that the at least one radial protrusion and recess lockingly engage to rotationally lock the hub and the annular element. In a second rotational direction, the frictional engagement urges the at least one engagement element radially outward so that the hub and the annular element are rotationally independent.

The present invention further broadly comprises a radial one-way clutch in a stator for a torque converter, including: a hub for the stator, the hub with at least one radial recess; an annular element, rotationally connected to blades for the stator and having at least one circumferential surface tapering radially inward in a first rotational direction; an annular frictional element rotationally fixed with the hub; at least one engagement element with at least one radial protrusion, the at least one engagement element radially disposed between the hub and the annular element and frictionally engaged with the frictional element; and at least one biasing element urging the at least one engagement element radially outward. In the first direction, the frictional engagement urges the at least one engagement element along the circumferential surface in the first direction, and the circumferential surface is arranged to urge the at least one engagement element radially inward to engage the at least one radial protrusion and recess to rotationally lock the hub and the angular element. In a second rotational direction, the frictional engagement urges the at least one engagement element along the circumferential surface so that the at least one engagement element displaces radially outward and the hub and the annular element are rotationally independent.

The present invention still further broadly comprises a radial one-way clutch for an automotive device, including: a first annular element; a second annular element arranged for rotational connection to a torque transmitting element in the automotive device; at least one engagement element radially disposed between the first and second annular elements and having at least one first interlocking feature; and an annular frictional element frictionally engaged with the at least one engagement element. One of the first and second annular elements includes at least one second interlocking feature and is rotationally locked with the annular frictional element. In a first rotational direction, the frictional engagement is arranged to urge the at least one engagement element to radially displace to rotationally connect with the first and second annular elements and torque from the second element is applied to the at least one engagement element in a substantially circumferential direction. In a second rotational direction, the frictional engagement is arranged to urge the at least one engagement element to radially displace such that the first and second annular elements are rotationally independent.

It is a general object of the present invention to provide a radial one-way clutch having a reduced axial width for use in automotive components.

It is another object of the present invention to provide a radial one-way clutch using stamped components for use in automotive components.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
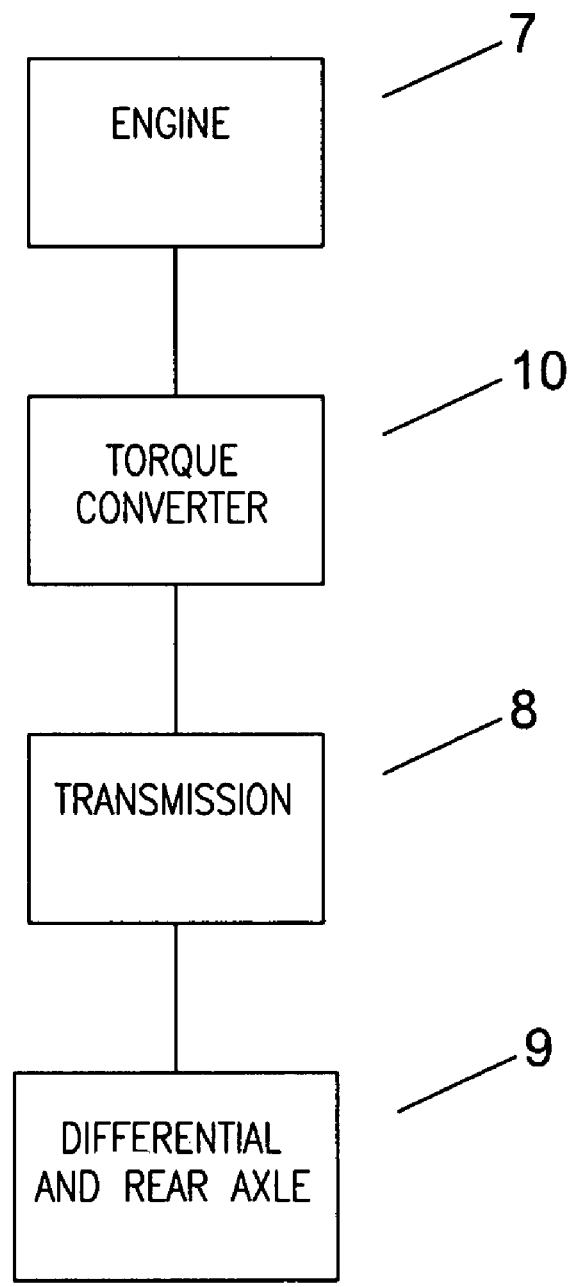
FIG. 1 is a general block diagram illustration of power flow in a motor vehicle, intended to help explain the relationship and function of a torque converter in the drive train thereof.
Figure 2:
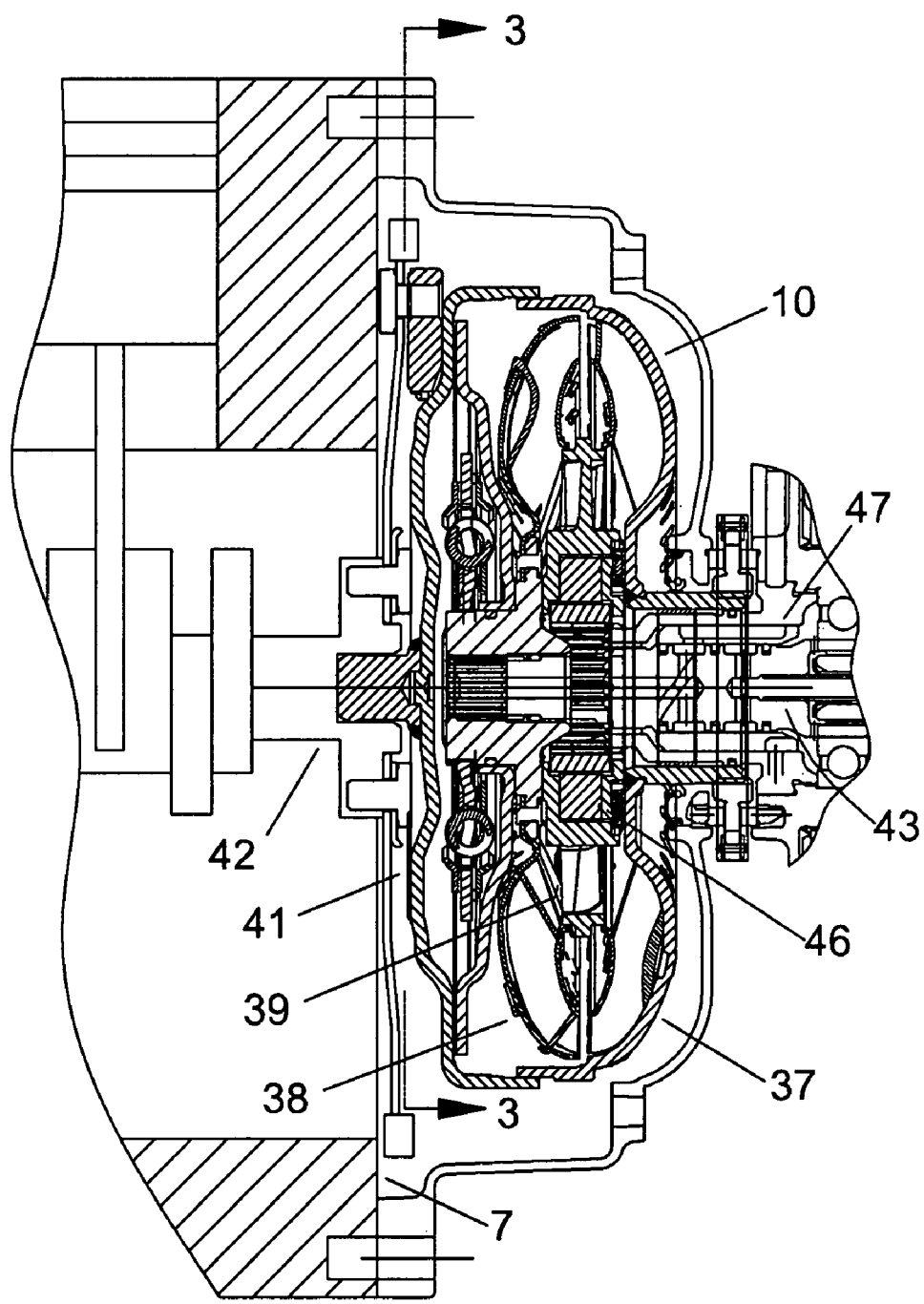
FIG. 2 is a cross-sectional view of a prior art torque converter, shown secured to an engine of a motor vehicle.
Figure 3:
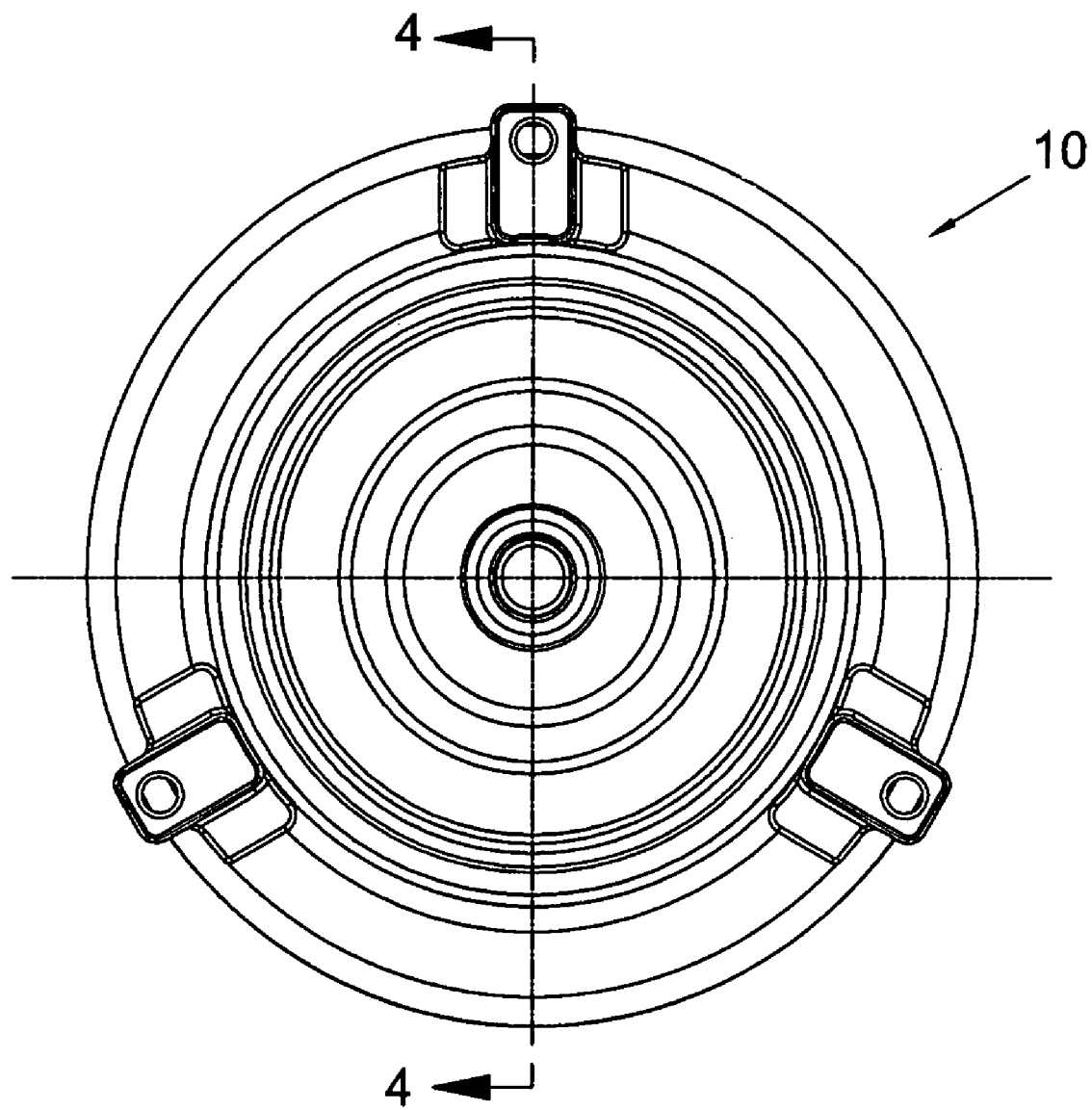
FIG. 3 is a left view of the torque converter shown in FIG. 2, taken generally along line 3-3 in FIG. 2.
Figure 4:
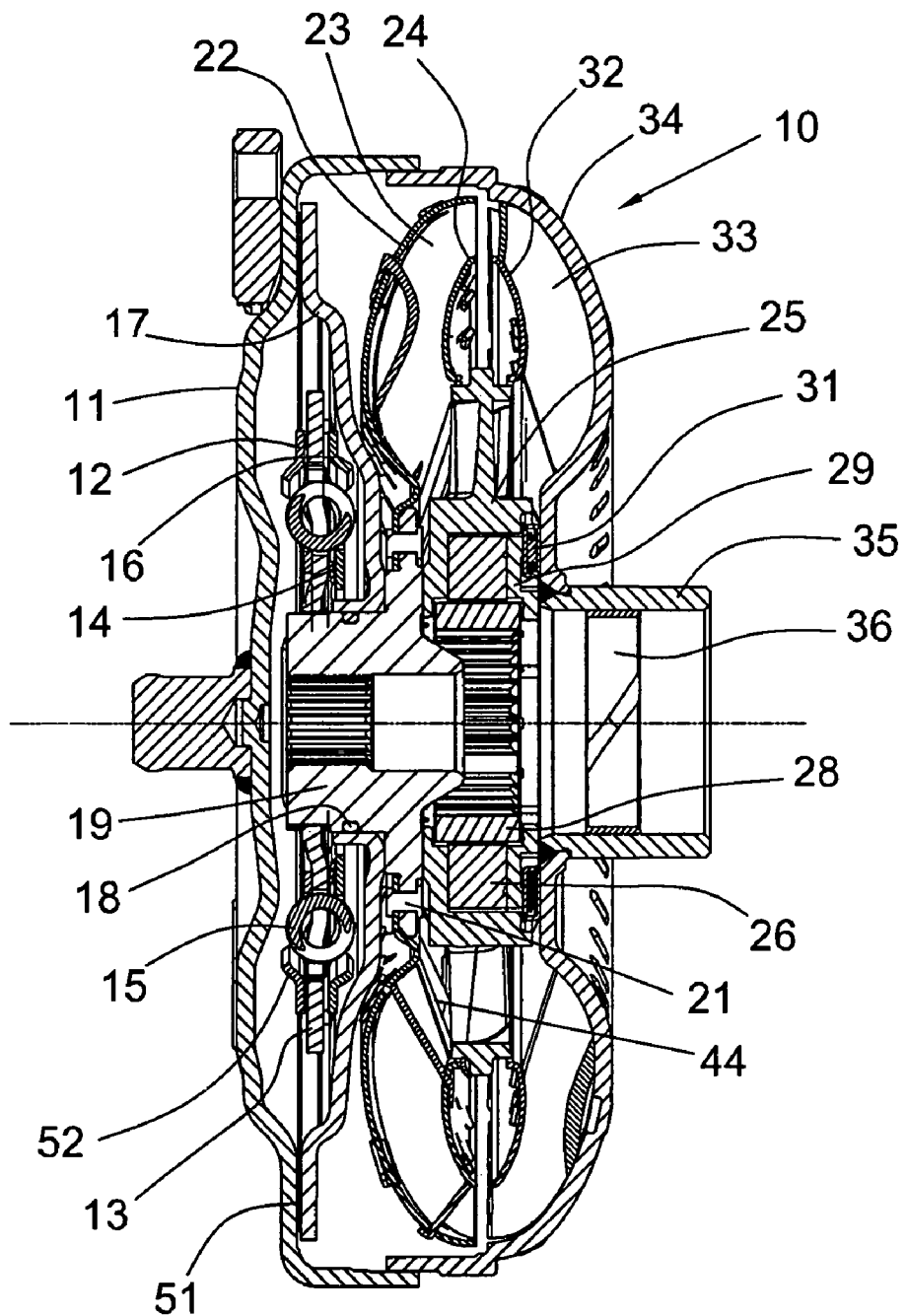
FIG. 4 is a cross-sectional view of the torque converter shown in FIGS. 2 and 3, taken generally along line 4-4 in FIG. 3.
Figure 5:
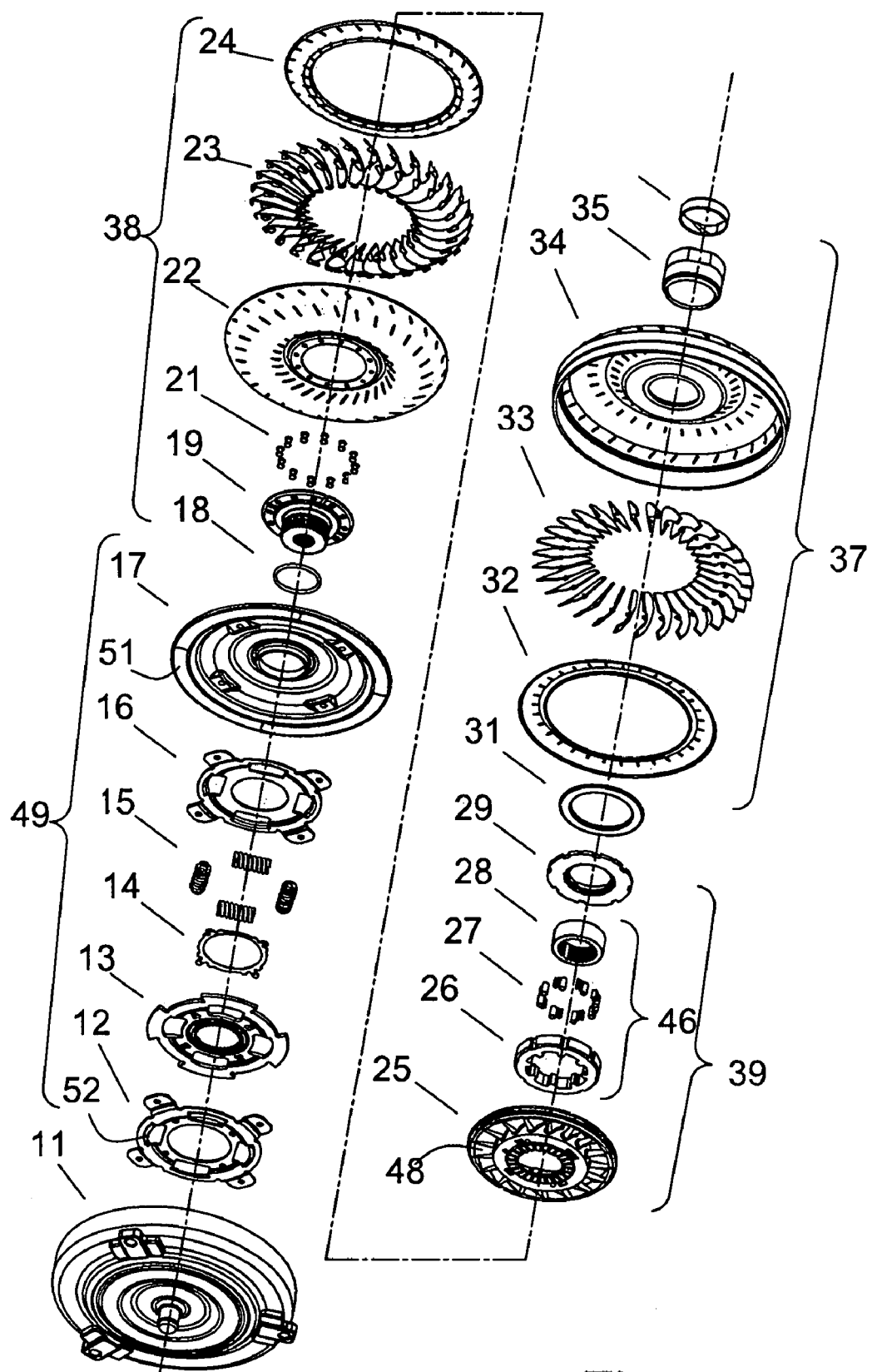
FIG. 5 is a first exploded view of the torque converter shown in FIG. 2, as shown from the perspective of one viewing the exploded torque converter from the left.
Figure 6:
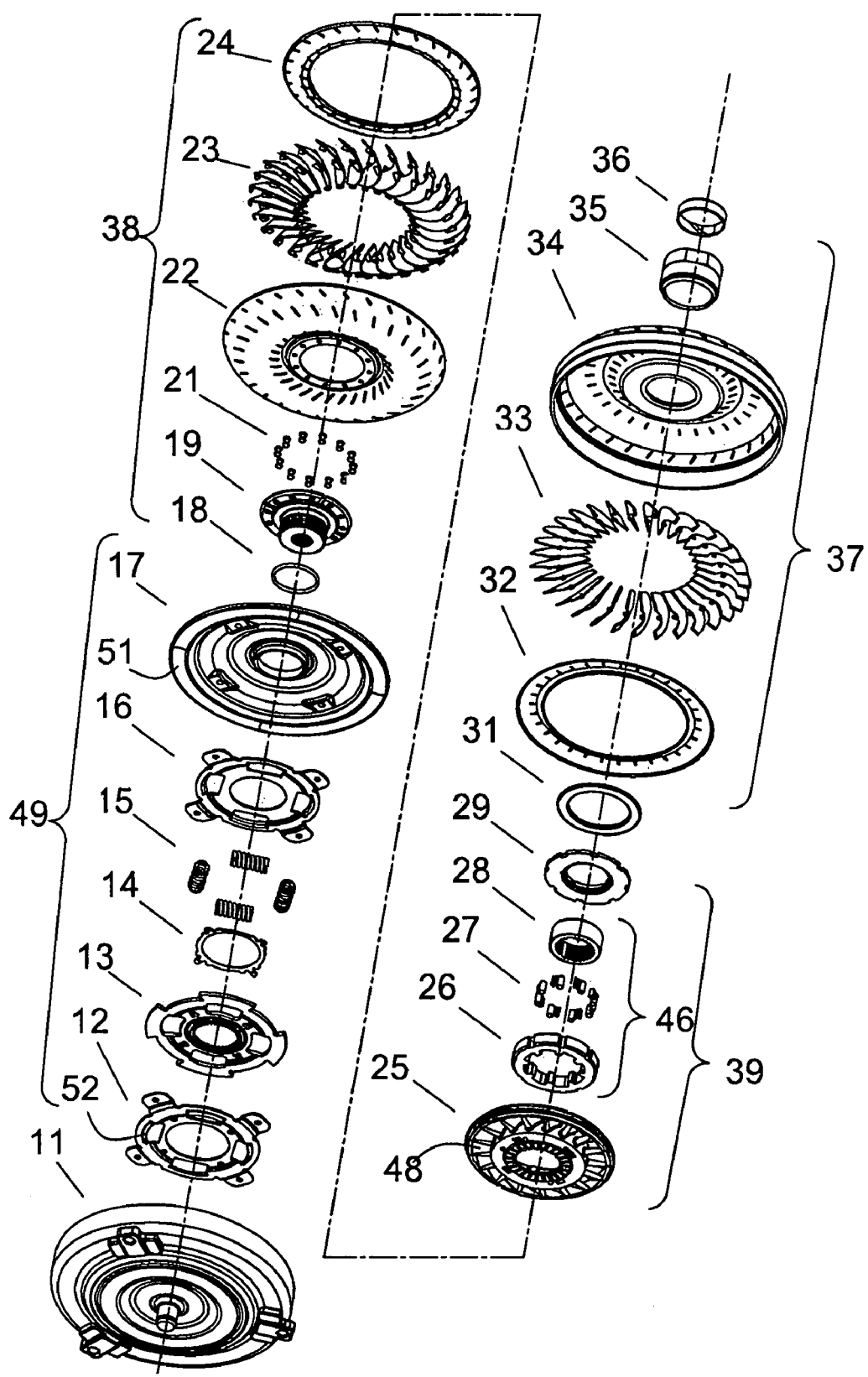
FIG. 6 is a second exploded view of the torque converter shown in FIG. 2, as shown from the perspective of one viewing the exploded torque converter from the right.
Figure 7A:
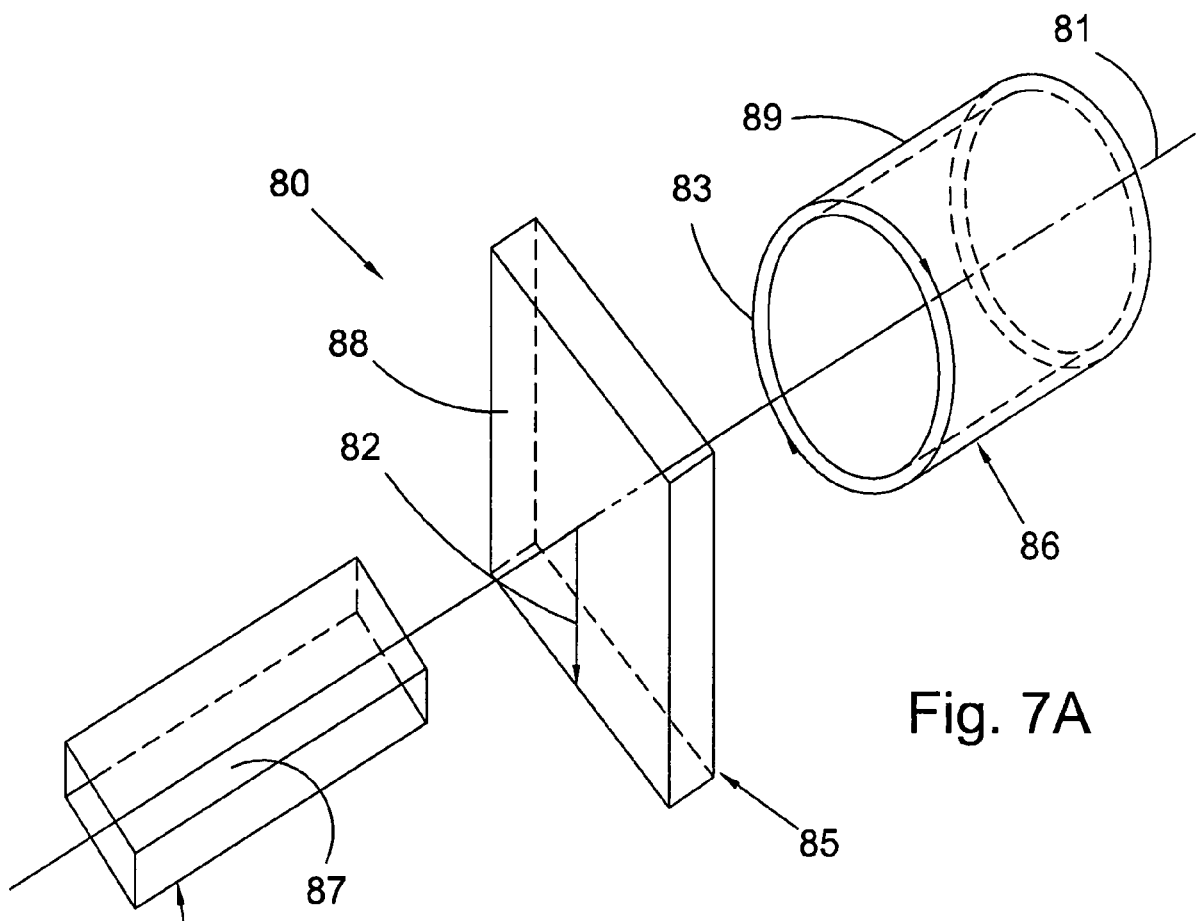
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" refer to orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" refer to an orientation parallel to axis 81, radius 82, or circumference 83, respectively. The adverbs "axially," "radially," and "circumferentially" refer to an orientation parallel to respective planes.

Figure 7B:
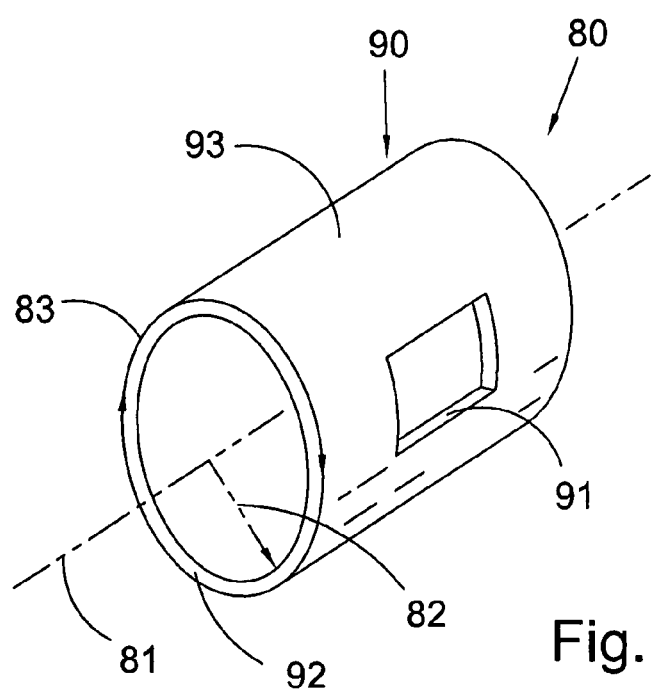
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
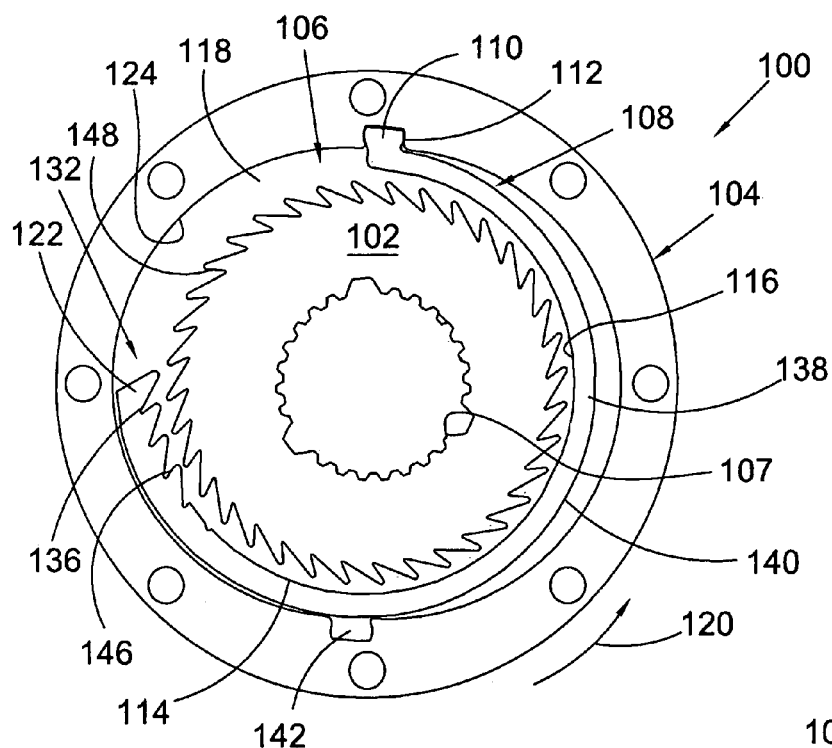
FIG. 8 is a front view of a present invention radial one-way clutch in a free-wheel mode.

FIG. 8 is a front view of present invention radial one-way clutch 100 in a free-wheel mode. Radial one-way clutch 100 includes annular elements 102 and 104 and annular frictional element 106. In some aspects, element 102 is arranged to be rotationally fixed. For example (not shown), element 102 is a hub rotationally connected to a non-rotatable shaft. By rotational connection, we mean that the hub and the shaft are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

In some aspects, element 102 is arranged to be rotatable. For example (not shown), element 102 is a hub rotationally connected to a rotatable shaft. In some aspects, element 102 is integrally formed with a hub. For example, element 102 in FIG. 8 includes inner spline 107 for connection to another component, such as a shaft (not shown). In the discussion that follows, it is assumed that element 102 is rotationally fixed.

Element 104 is arranged for rotational connection to a torque transmitting assembly or component. For example, in some aspects (not shown), clutch 100 is used in a stator for a torque converter and element 104 is rotationally connected to blades for the stator. Element 106 is rotationally locked with element 102. By rotationally locked, we mean that the two components are rotationally synchronized and the two components are fixed with respect to rotation. Components do not need to be directly connected to be rotationally locked. For example, if one component is made to be non-rotatable, the other component also is non-rotatable. In some aspects, element 106 is arranged for direct connection to a shaft. In some aspects (not shown), element 106 is rotationally connected to a hub or element 102 or is integral with element 102.

Clutch 100 also includes at least one engagement element 108 radially disposed between said annular elements 102 and 104. In general, frictional element 106 is rotationally connected to whichever of annular elements 102 or 104 is not connected to engagement element 108. Element 108 is rotationally connected to element 104, for example, end 110 is disposed in notch 112. It should be understood that any means known in the art can be used to rotationally connect elements 108 and 104. In the configuration shown, element 106 is rotationally locked with element 102, and therefore, rotationally fixed, or non-rotatable. Element 108 is rotationally connected to element 104, and therefore is rotatable. There is frictional contact between elements 106 and 108. In some aspects, the frictional contact is between a relatively small portion of element 108 and element 106, for example, at point 114 on inner circumference 116 of element 108 and radial surface 118 of element 106. It should be understood that the frictional contact can be at other points along element 108 or at multiple points on element 108. In rotational direction 120, a direction associated with a free-wheel mode for clutch 100, annular elements 102 and 104 are arranged to be rotationally independent. Specifically, element 104 rotates in direction 120, element 108 also rotates in the same direction, and the frictional contact between rotationally fixed element 106 and rotating element 108 urges element 108 to radially displace. In those aspects in which both elements 102 and 104 are rotatable, element 102 rotating at a lesser rate than element 104, creates a relative difference in rotational speed that enables the frictional contact between element 108 and element 106. In FIG. 8, the radial displacement is outward. For example, end 122 moves outward until the end contacts inner circumference 124 of element 104. Thus, the frictional contact is sufficient to engage element 108 with element 106 and to urge element 108 to move radially with respect to element 106. With element 108 disposed against surface 124, element 104 is free to rotate without engaging elements 102 or 106. That is, elements 102 and 104 are rotationally independent.

Figure 9:
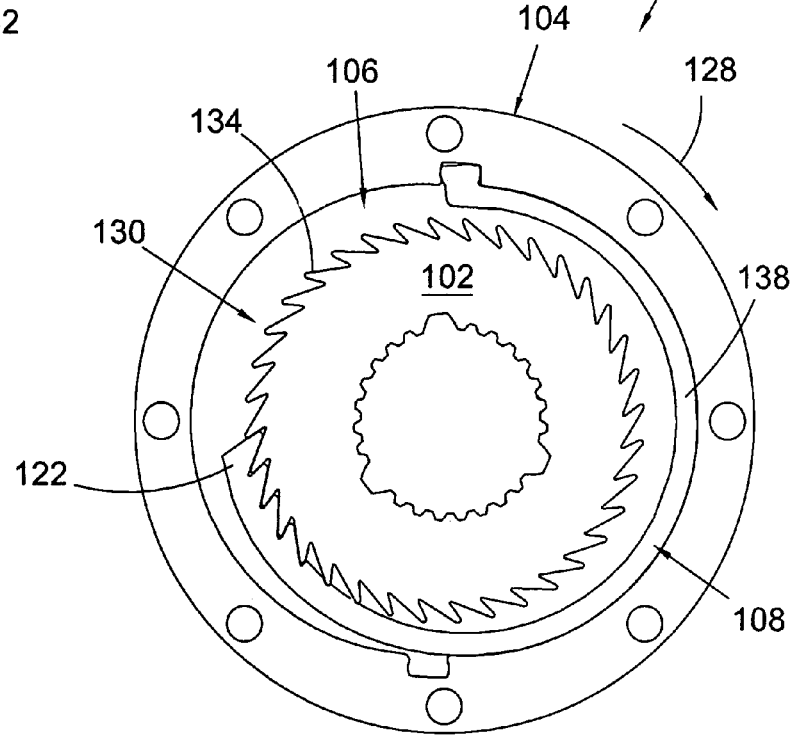
FIG. 9 is a front view of a present invention radial one-way clutch in a lock-up mode.
Figure 10:
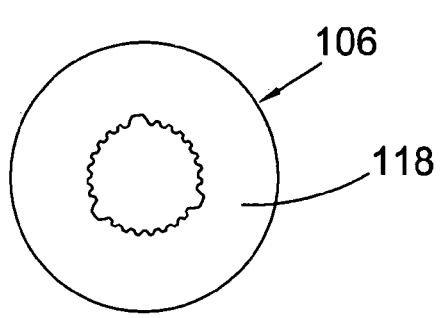
FIGS. 10 through 14 are respective front views of components for the one-way clutch shown in FIGS. 8 and 9.
Figure 11:
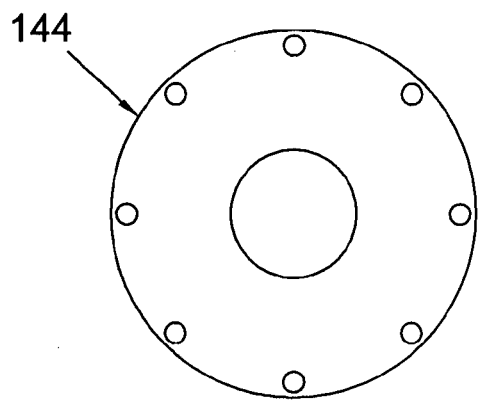
Figure 12:
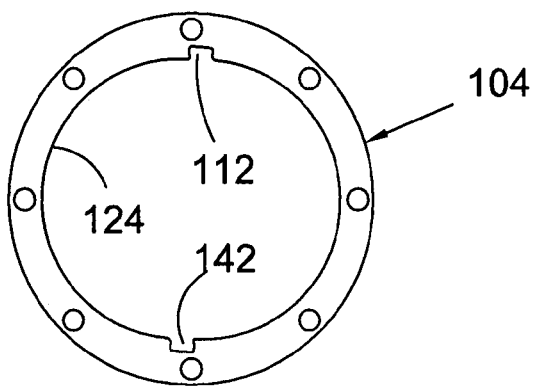
Figure 13:
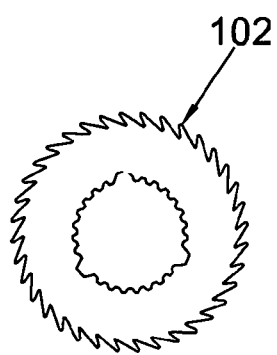
Figure 14:
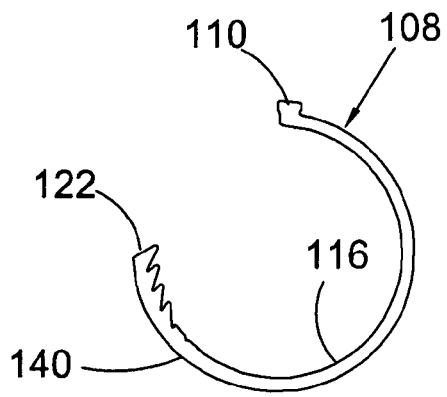

FIG. 9 is a front view of present invention radial one-way clutch 100 in a lock-up mode. The following should be viewed in light of FIGS. 8 and 9. In rotational direction 128, associated with a lock-up mode, engagement element 108 is arranged to rotationally connect with annular elements 102 and 104. For example, element 104 rotates in direction 128, element 108 also rotates in the same direction, and the frictional contact between elements 106 and 108 urges element 108 to radially displace. In FIG. 9, the radial displacement is inward. For example, end 122 moves inward until elements 102 and 108 lock.

To enable the locking of elements 102 and 108, element 102 includes interlocking features 130 and element 108 includes interlocking features 132. Features 130 and 132 are complimentarily formed so that the features mating engage, or mesh together. In some aspects, features 130 and 132 are radial protrusions and recesses or radial recesses and protrusions, respectively. For example, protrusion 134 extends radially outward from element 102 and recess 136 recedes radially outward in element 108. Given the symmetry of the interlocking features it is understood that elements 102 and 108 can both be understood to include both protrusions and recesses. Frictional element 106 is rotationally locked with whichever of elements 102 or 104 includes interlocking features.

Clutch 100 is arranged to attenuate the energy, for example, the noise, associated with the rotational locking of elements 102, 104, and 108. For example, the frictional contact between elements 106 and 18 absorbs portions of the torque transmitted by element 104. That is, some of the torque is required to overcome the frictional contact. In some aspects, element 108 is an elastically deformable element, for example, a spring and the tension in the spring resists movement in the locking direction. When the interlocking features first mate, portion 138, on circumference 140 of element 108, is not in contact with element 104. As torque is transmitted from element 104 to element 102, element 108 is driven in direction 120, element 108 absorbs a portion of the torque from element 104, cushioning portion 138 as the portion is driven into contact with element 104 as shown in FIG. 9. Thus, some of the torque is dispelled to overcome the preload and move element 108. In general, circumferences 124 and 140 have smooth surfaces.

In some aspects (not shown), clutch 100 is located in a fluid-filled device and the fluid is disposed between the interlocking features in the free-wheel mode. As torque transmitted by element 104 in the locking mode causes the interlocking features to move together (matingly engage), the protrusions displace fluid from the recesses. The displacement action absorbs a portion of torque from element 104. In some aspects (not shown), clutch 100 is disposed in a device, such as a stator, with side plates disposed on opposite radial sides of the clutch. That is, the plates axially sandwich the clutch. The plates at least partially contain the fluid between the interlocking features. The plates restrict the passage of fluid out of the recesses, increasing the amount of energy (torque from element 104) needed to displace the fluid.

In some aspects (not shown), clutch 100 includes more than one engagement element. For example, a second engagement element could be rotationally connected at notch 142 in element 104. In this case, the lengths of the engagement elements are modified to enable overlapping of the engagement elements.

FIGS. 10 through 14 are respective front views of components for one-way clutch 100 shown in FIGS. 8 and 9. In some aspects, backing plate 144 is disposed behind element 104 and element 104 is rotationally connected to plate 144. In some aspects, plate 144 transmits torque to element 104.

Figure 15:
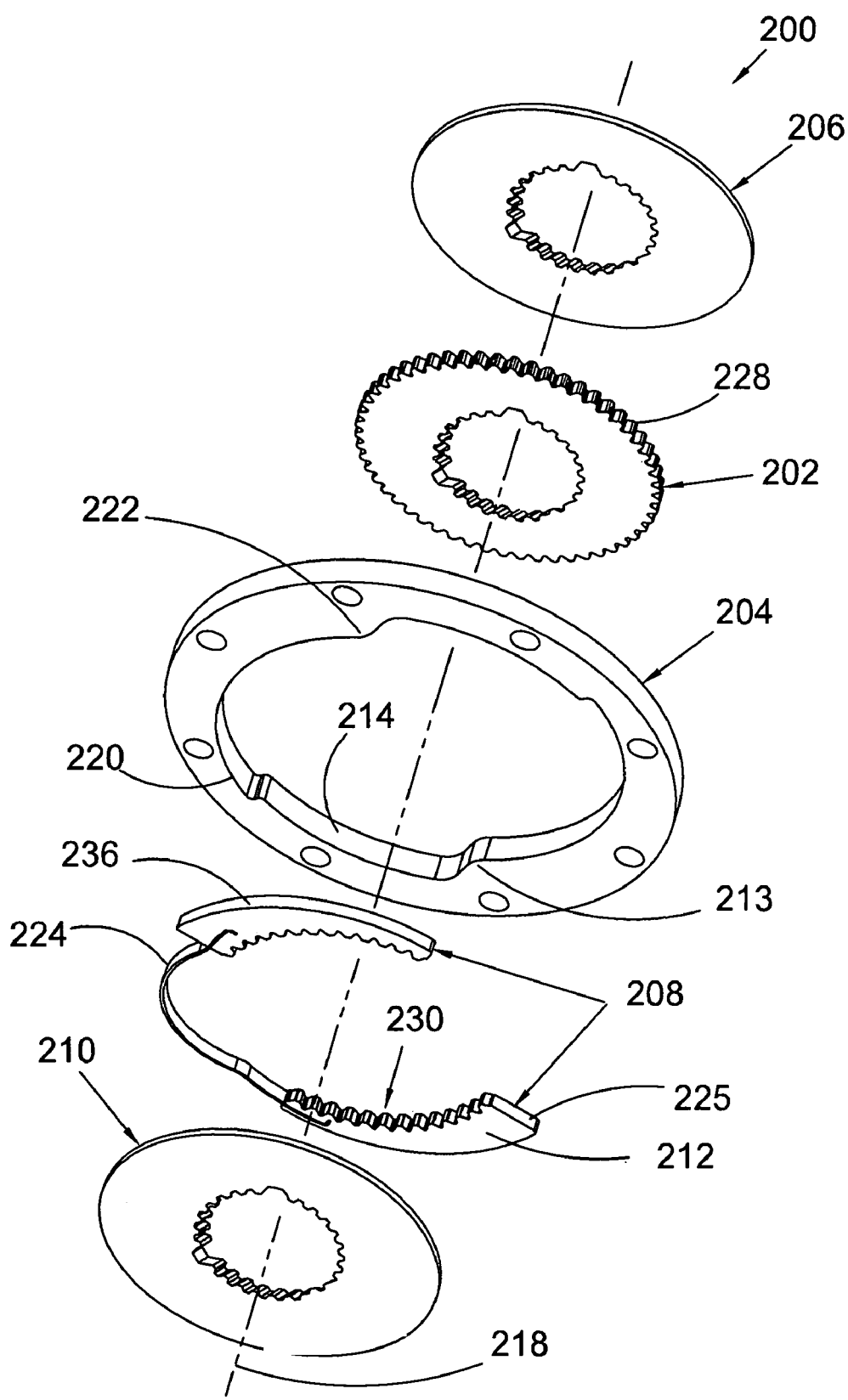
FIG. 15 is a front exploded front view of a present invention radial one-way clutch.

FIG. 15 is a front exploded front view of present invention radial one-way clutch 200. Radial one-way clutch 200 includes annular elements, or plates, 202 and 204 and annular frictional element, or plate, 206. The discussion in the descriptions of FIGS. 8 and 9 regarding the rotational arrangements of element 102 is applicable to element 202. That is, is some aspects, element 202 is a hub rotationally connected to a non-rotatable shaft and in some aspects, element 202 is arranged to be rotatable. In the discussion that follows, it is assumed that element 202 is rotationally fixed.

The discussion in the descriptions of FIGS. 8 and 9 regarding the rotational arrangements of element 104 is applicable to element 204. That is, in some aspects, element 104 is arranged for rotational connection to a torque transmitting assembly or component. Element 206 is rotationally locked with element 202. In some aspects, element 206 is arranged for direct connection to a shaft. In some aspects (not shown), element 206 is rotationally connected to a hub or element 202 or is integral to element 202.

Clutch 200 also includes engagement elements 208 radially disposed between annular elements 202 and 204. Element 208 is not directly connected to elements 202 or 204. In the configuration shown, element 206 is rotationally locked with element 202, and therefore, rotationally fixed, or non-rotatable. Elements 208 are rotatable. End plate 210 is rotationally locked with element 202. In some aspects (not shown) an annular elastically deformable element, for example, a diaphragm spring, is axially disposed between plate 210 and elements 208. The deformable element is in contact with the radial surface of elements 208, for example, surface 212, and exerts an axial pressure on elements 208. This pressure holds elements 208 in axial alignment and creates a frictional contact with plate 206.

Figure 16:
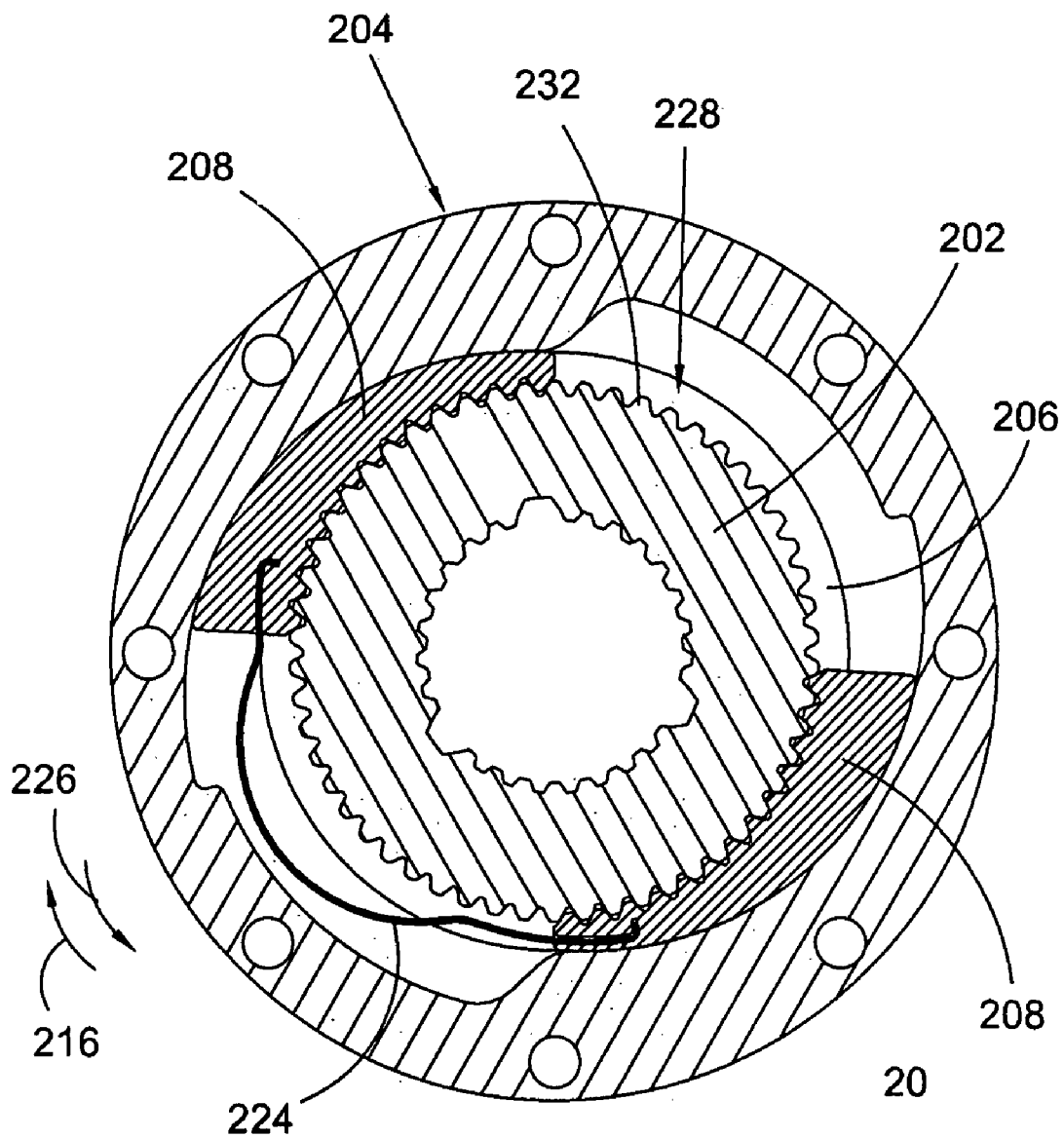
FIG. 16 is a front cross-sectional view through the torque transmitting element of the radial one-way clutch shown in FIG. 15 in a lock-up mode.

FIG. 16 is a front cross-sectional view through element 204 in radial one-way clutch 200 shown in FIG. 15 in a lock-up mode.

Figure 17:
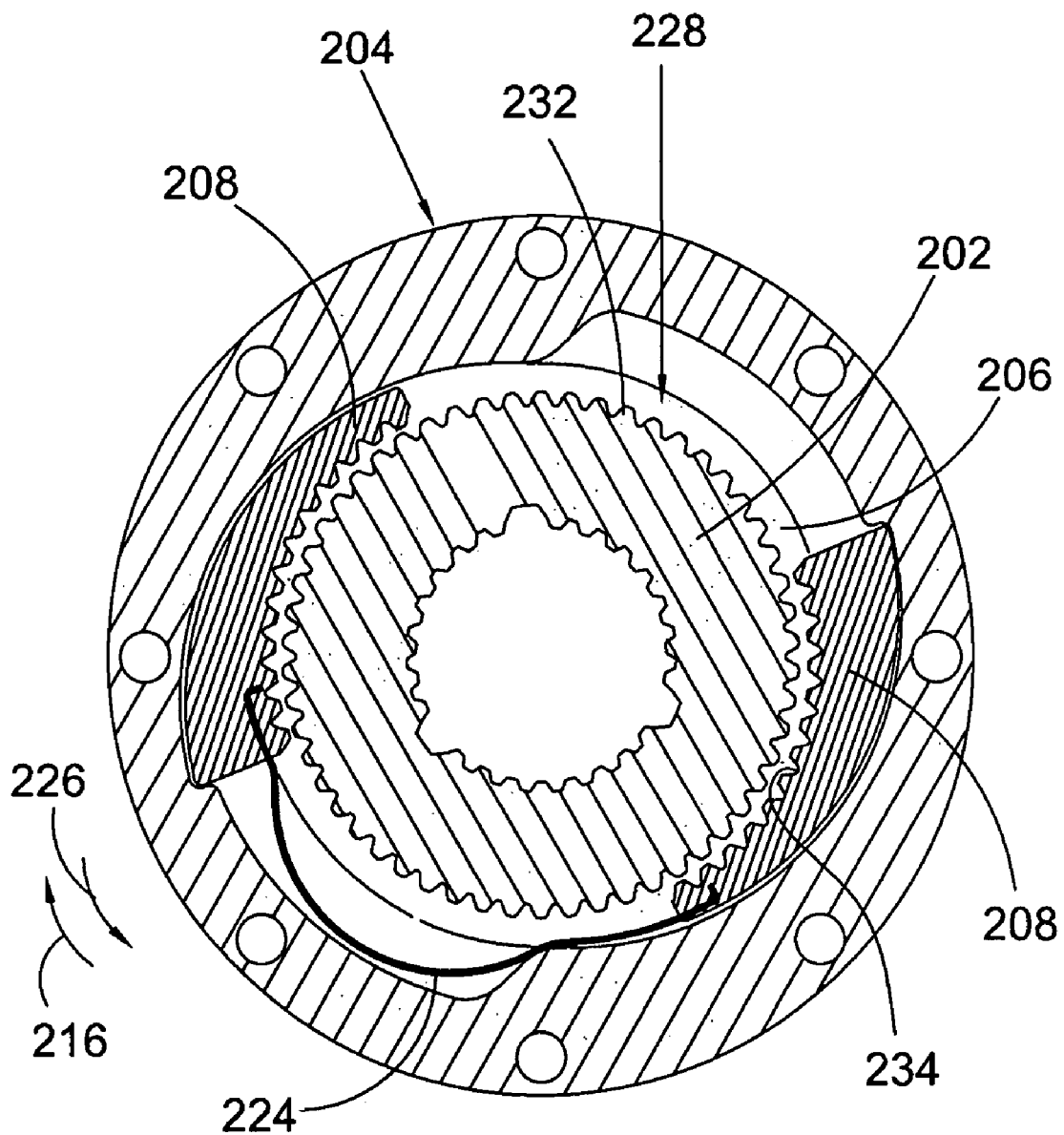
FIG. 17 is a front cross-sectional view through the torque transmitting element of the radial one-way clutch shown in FIG. 15 in a free-wheel mode.

FIG. 17 is a front cross-sectional view through element 204 in radial one-way clutch 200 shown in FIG. 15 in a lock-up mode. The following should be viewed in light of FIGS. 15 through 17. Plate 204 includes radial ramps 213 on circumferential surface 214. The ramps taper radially inward in direction 216, the direction associated with a free-wheel mode. For example, surface 214 becomes radially closer to longitudinal axis 218 moving in direction 216 from point 220 to point 222. Clutch 200 also includes biasing element 224 connected to elements 208. The biasing element acts to urge the engagement elements radially outward. Any biasing element known in the art, such as a spring, can be used for element 224. In some aspects, more than one biasing element is used. For example, a second biasing element can be connected to ends 225 of elements 208, that is, radially opposite the biasing elements shown in the figures.

Referring to FIG. 16, in rotational direction 226, associated with a lock-up mode, engagement element 208 is arranged to rotationally connect with annular element 202 so as to rotationally connect elements 202 and 204. In rotational direction 226, the frictional contact between elements 206 and 208 urges element 208 to radially displace. In FIG. 16, the radial displacement is inward. Specifically, the frictional engagement of plate 206 and elements 208 causes the elements to slide along the ramps and circumferential surface 214. The inwardly tapering circumferential surface is arranged to urge the engagement elements radially inward. That is, the circumferential surface is arranged to urge the engagement elements and plate 202 into a rotational lock.

Referring to FIG. 17, in rotational direction 216, the direction associated with a free-wheel mode for clutch 200, annular elements 202 and 204 are arranged to be rotationally independent. Specifically, the frictional engagement of plate 206 and elements 208 causes the elements to slide along the ramps and circumferential surface 214. Thus, biasing element 224 and inwardly tapering circumferential surface 214 are arranged to urge the engagement elements radially outward, or to radially displace, and elements 202 or 204 are rotationally independent.

To enable the locking of elements 202 and 208, element 202 includes interlocking, features 228 and element 208 includes interlocking features 230. Features 228 and 230 are complimentarily formed so that the features mating engage, or mesh together. In some aspects, features 228 and 230 are radial protrusions, and recesses or radial recesses and protrusions, respectively. For example, protrusion 232 extends radially outward from element 202 and recess 234 recedes radially outward in element 208. Given the symmetry of the interlocking features it is understood that elements 202 and 208 can both be understood to include both protrusions and recesses. As with element 106 in FIGS. 8 and 9, element 206 is rotationally locked with whichever of elements 202 or 204 includes interlocking features.

Clutch 200 is arranged to attenuate the energy, for example, the noise, associated with the rotational locking of elements 202, 204, and 208. For example, the frictional contact between elements 206 and 208 absorbs portions of the torque transmitted by element 204. The friction generated by the sliding of the engagement elements with the tamps on element 204 also absorbs a portion of the torque. That is, some of the torque is required to overcome the frictional contact. Biasing element 224 also presents a force opposing the torque. That is, the biasing element is pushing the engagement elements radially outward and the torque must overcome this bias.

In some aspects (not shown), clutch 200 is located in a fluid-filled device and the fluid is disposed between the interlocking features in the free-wheel mode. As torque transmitted by element 204 in the locking mode causes the interlocking features to move together (matingly engage), the protrusions displace fluid from the recesses. The displacement action absorbs a portion of torque from element 204. In some aspects (not shown), clutch 200 is disposed in a device, such as a stator, with side plates disposed on opposite radial sides of said clutch. That is, the plates axially sandwich the clutch. The plates at least partially contain the fluid between the interlocking features. The plates restrict the passage of fluid out of the recesses, increasing the amount of energy (torque from element 204) needed to displace the fluid.

In some aspects (not shown), clutch 200 includes more than two engagement, elements or a single engagement element.

The following should be viewed in light of FIGS. 8 through 17. Clutch 100 is used as an example in the following discussion, however, it should be understood that the discussion applies to present invention one-way clutches in general. As noted supra, roller and sprag one-way clutches require significant axial widths to handle the forces associated with locking mode, since the force-bearing components have nominal circumferential extent and the force is applied in a radial direction. In contrast, clutch 100 applies the force in a substantially circumferential direction. For example, the torque transmitted by element 104 through the engagement element to element 102 is applied primarily in a rotational, or circumferential, direction from surfaces 146 of interlocking features 132 to surfaces 148 of interlocking features 130.

In addition, clutch 100 advantageously maximizes the circumferential extent of the area of elements 102 and 108 handling the torque transmitted by element 104. As noted supra, an intermediary element(s) in a one-way clutch must sustain the torque delivered by the torque transmitting element of the clutch. That is, the intermediary element(s) must have a certain amount of contact surface area. Advantageously, a present invention clutch is able to gain the necessary surface area primarily in a substantially circumferential orientation, with a minimal axial extent. Thus, the axial width of a present invention clutch can be advantageously minimized.

In some aspects, element 102 is arranged for rotational connection to a torque transmitting assembly or component and element 104 is not rotatable or may rotate at a lesser rate than element 102. In this case, clutch 100 operates as expected for a one-way clutch. For this configuration, the radial displacement of element 106 and rotational connection of elements 102 and 108 remain as described for FIGS. 8 and 9. However, the directions for free-wheel and locking modes are reversed if elements 102 and 108 remain as shown in FIGS. 8 and 9. For example, direction 120 is the direction for the locking mode. To maintain the same directions shown in FIGS. 8 and 9, the configuration of elements 102 and 108 can be flipped or mirrored. That is, element 108 runs counter-clockwise from notch 112 and protrusions 134 are circumferentially reversed.

Regarding FIGS. 15 through 17, if element 202 is arranged for rotational connection to a torque transmitting assembly or component and element 204 is rotatable or may rotate at a lesser rate, clutch 200 also operates as expected for a one-way clutch and the operation of elements 202, 204, 206, and 208 with respect to rotational engagement remain as described in FIGS. 15 through 17. However, the directions for free-wheel and locking modes are reversed if elements 204 and 208 remain as shown in FIGS. 15 through 17. To maintain the same directions shown in FIGS. 15 through 17, the configuration of elements 204 and 208 can be flipped or mirrored. That is, element 208 is tapered in a counterclockwise direction and ramps 212 taper radially outward in direction 216.

In some aspects (not shown), the configuration of interlocking elements shown in FIGS. 8 and 9 is reversed. Element 108 is rotationally connected to element 102 and interlocking features are located on surface 140 of element 108 and on surface 124 of element 104. The outer circumference of element 102 and circumference 116 are smooth. In this configuration, the free-wheel and locking mode directions are reversed. In direction 120 (now locking mode), the frictional contact urges element 108 to displace radially outward, matingly engaging the interlocking feature. In direction 128, the frictional contact urges element 108 to displace radially inward, so that elements 102 and 104 are rotationally independent. The preceding discussion also is applicable to aspects in which element 102 is arranged for rotational connection to a torque transmitting assembly or component.

In some aspects (not shown), the configuration of interlocking elements shown in FIGS. 15 through 17 is reversed. For example, surface 214 is at a uniform radial distance from axis 218 and has interlocking features and surface 236 has complimentary interlocking features. The ramps are formed on outer circumference 238 of element 202 and inner edges 240 of elements 208 are smoothed to engage with the ramps. In this configuration, the free-wheel and locking mode directions are reversed. The preceding discussion also is applicable to aspects in which element 202 is arranged for rotational connection to a torque transmitting assembly or component.

The components in a present invention clutch can be formed by stamping. For example, elements 202, 204, 206, 208, and 210 in clutch 200 can be stamped. It should be understood that a present invention clutch can include any combination of stamped and non-stamped components.

Figure 18:
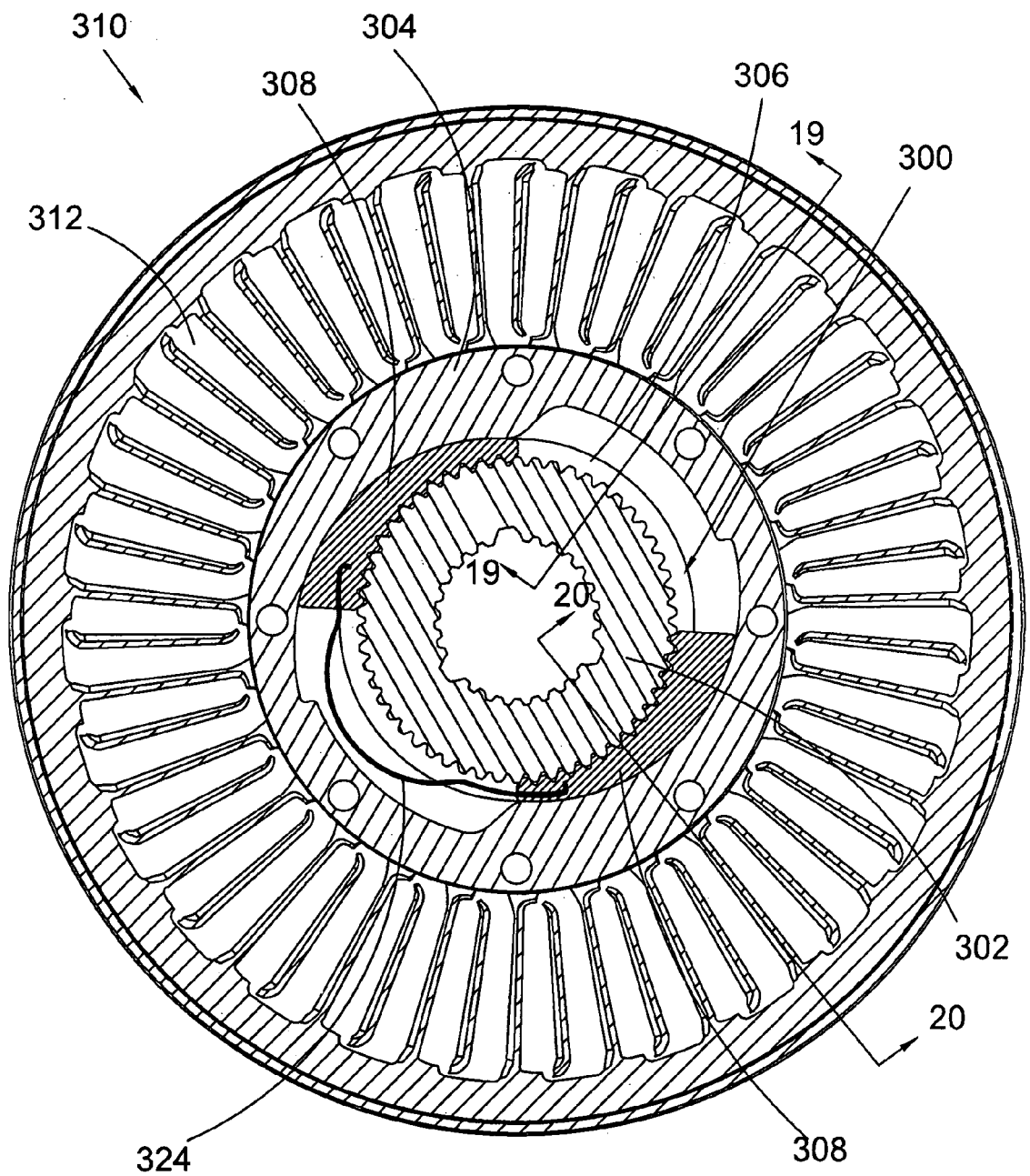
FIG. 18 is a front cross-sectional view of a present invention radial one-way clutch in a stator for a torque converter.

FIG. 18 is a front cross-sectional view of present invention radial one-way clutch 300 in stator 301 for a torque converter.

Figure 19:
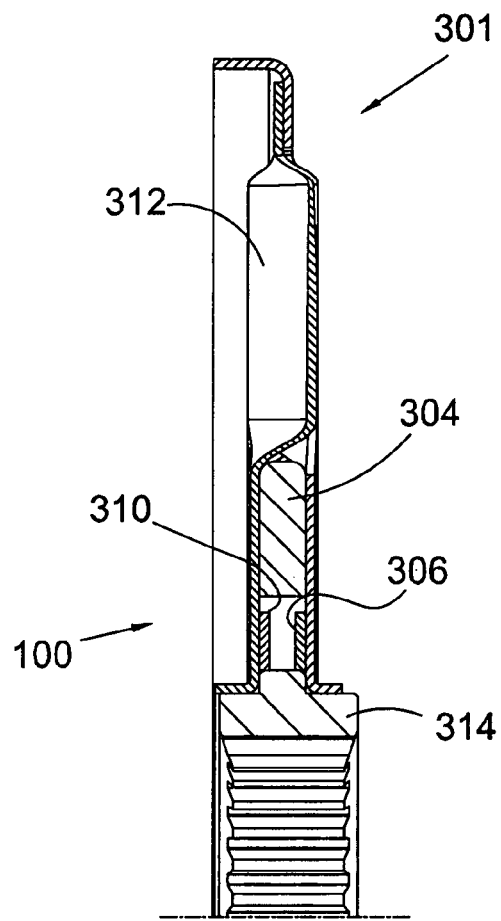
FIG. 19 is a partial cross-sectional view of the clutch shown in FIG. 18 along line 19-19 in FIG. 18; and, FIG. 20 is a partial cross-sectional view of the clutch shown in FIG. 18 along line 20-20 in FIG. 18.

FIG. 19 is a partial cross-sectional view of clutch 300 as shown in FIG. 18 along line 19-19 in FIG. 18.

Figure 20:
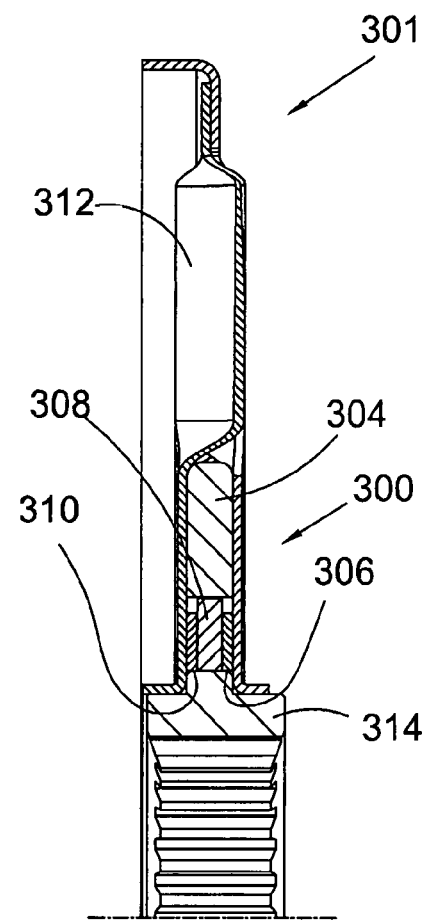

FIG. 20 is a partial cross-sectional view of clutch 300 shown in FIG. 18 along line 20-20 in FIG. 18. The following should be viewed in light of FIGS. 18 through 20. In general, the discussions for FIGS. 15 through 17 regarding clutch 200 are applicable to clutch 300. Clutch 300 includes elements 302, 304, 306, and 308, and 310 substantially similar to elements 202, 204, 206, 208, and 210, respectively, in FIGS. 8 and 9. FIGS. 18 through 20 give an example of a present invention clutch in a particular automotive device, in this case, stator 302. Element 304 is rotationally connected to blades 312 in the stator and transmits torque from the blades. Element 314 is a hub for the stator and is arranged for rotational connection to a stator shaft (not shown), which is typically not rotatable. It should be understood that a present invention clutch is not limited to use with a stator having the configuration shown in the figures. Further, it should be understood that a present invention clutch is not limited to use with only a stator and that the use of a present invention clutch in any automotive device, or component, such as a transmission, is within the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A radial one-way clutch for an automotive device, comprising:
    a first annular element;
    a second annular element arranged for rotational connection to a torque transmitting element in said automotive device;
    at least one engagement element radially disposed between said first and second annular elements and having at least one first interlocking feature; and,
    an annular frictional element frictionally engaged with said at least one engagement element, wherein a first one of said first and second annular elements further comprises at least one second interlocking feature and is rotationally locked with said annular frictional element, wherein in a first rotational direction, said frictional engagement is arranged to urge said at least one engagement element to radially displace to engage said at least one first and second interlocking features to rotationally connect said first and second annular elements, wherein in a second rotational direction, said frictional engagement is arranged to urge said at least one engagement element to radially displace such that said first and second annular elements are rotationally independent.

2. The clutch of claim 1 wherein in said first direction, said frictional contact is arranged to urge said at least one engagement element radially inward and wherein in said second direction, said frictional contact is arranged to urge said at least one engagement element radially outward.

3. The clutch of claim 1 wherein in said first direction, said frictional contact is arranged to urge said at least one engagement element radially outward and wherein in said second direction, said frictional contact is arranged to urge said at least one engagement element radially inward.

4. The clutch of claim 1 wherein said second element is arranged to transmit a force in said first direction, and said frictional contact is arranged to absorb at least a portion of said force.

5. The clutch of claim 1 wherein said at least one engagement element comprises an area, having a circumferential extent and an axial extent, arranged to engage said one of said first and second annular elements and wherein said circumferential extent is greater than said axial extent.

6. The clutch of claim 1 wherein said second interlocking feature is formed complimentarily with respect to said first interlocking feature and wherein in said first rotational direction, said at least one first and second interlocking features are arranged to matingly engage to rotationally lock said first one of said first and second annular elements and said at least one engagement element.

7. The clutch of claim 6 wherein in said second direction, said at least one first and second interlocking feature are free of contact.

8. The clutch of claim 6 wherein said first interlocking feature further comprises one of a radial protrusion or radial recess and said second interlocking feature further comprises the other of said radial protrusion or said radial recess.

9. The clutch of claim 6 wherein said device further comprises fluid disposed between said at least one first and second interlocking features and one of said at least one first and second interlocking features is arranged to displace said fluid.

10. The clutch of claim 9 wherein said second annular element is arranged to transmit a force in said first direction, and said displacement of said fluid is arranged to absorb at least a portion of said force.

11. The clutch of claim 9 further comprising first and second side plates disposed on opposite radial sides of engagement element and arranged to at least partially contain said fluid between said at least one first and second interlocking features.

12. The clutch of claim 1 wherein a second one of said first and second annular elements further comprises at least one circumferential surface tapering radially inward in said second direction, wherein in said first direction, said frictional engagement causes said at least one engagement element to slide along said circumferential surface, and said circumferential surface is arranged to urge said at least one engagement element radially toward said at least one first interlocking feature.

13. The clutch of claim 12 wherein said circumferential surface is arranged to urge said at least one engagement element to rotationally connect with said first one of said first and second annular elements to rotationally connect said first and second annular elements.

14. The clutch of claim 12 further comprising at least one first biasing element connected to said at least one engagement element and urging said at least one engagement element radially away from said first interlocking feature.

15. The clutch of claim 12 wherein in said second direction, said at least one engagement element is arranged to slide along said circumferential surface to disengage from said one of said first and second annular elements.

16. The clutch of claim 1 wherein said second annular element is arranged to transmit a force in said first direction and said at least one engagement element is elastically deformable to absorb at least a portion of said force.

17. The clutch of claim 1 wherein said second annular element is arranged to transmit a force in said first direction, said at least one engagement element further comprises first and second engagement elements connected by at least one elastically deformable element, and said at least one elastically deformable element is arranged to absorb at least a portion of said force.

18. The clutch of claim 17 further comprising an annular elastically deformable element in contact with said first and second engagement elements and applying axial pressure to said first and second engagement elements.

19. The clutch of claim 1 wherein said second element is arranged to transmit a force in said first rotational direction and said second element is arranged to apply said force to said at least one engagement element in a substantially circumferential direction.

20. The clutch of claim 1 wherein said at least one engagement element is rotationally connected to said second annular element.

21. The clutch of claim 1 wherein said first annular element is non-rotatable.

22. The clutch of claim 1 wherein said first annular element is rotatable.

23. A radial one-way clutch in a stator for a torque converter, comprising:
   a hub for said stator, said hub including at least one radial protrusion;
   an annular element rotationally connected to blades for said stator;
   an annular frictional element rotationally locked with said hub; and,
   at least one elastically deformable engagement element radially disposed between said hub and said annular element, rotationally connected to said annular element, and frictionally engaged with said frictional element, having at least one radial recess, wherein in said first rotational direction, said frictional engagement urges said at least one engagement element radially inward so that said at least one radial protrusion and recess lockingly engage to rotationally lock said hub and said annular element, wherein in a second rotational direction, said frictional engagement urges said at least one engagement element radially outward so that said hub and said annular element are rotationally independent.

24. A radial one-way clutch in a stator for a torque converter, comprising:
   a hub for said stator, said hub with at least one radial recess;
   an annular element, rotationally connected to blades for said stator and having at least one circumferential surface tapering radially outward in a first rotational direction;
   an annular frictional element rotationally fixed with said hub;
   at least one engagement element with at least one radial protrusion, said at least one engagement element radially disposed between said hub and said annular element and frictionally engaged with said frictional element; and,
   at least one biasing element urging said at least one engagement element radially outward, wherein in said first direction, said frictional engagement urges said at least one engagement element along said circumferential surface, and said circumferential surface is arranged to urge said at least one engagement element radially inward to engage said at least one radial protrusion and recess to rotationally lock said hub and said annular element, and wherein in a second rotational direction, said frictional engagement urges said at least one engagement element along said circumferential surface so that said at least one engagement element displaces radially outward and said hub and said annular element are rotationally independent.

25. A radial one-way clutch for an automotive device, comprising:
   a first annular element;
   a second annular element arranged for rotational connection to a torque transmitting element in said automotive device;
   at least one engagement element radially disposed between said first and second annular elements and having at least one first interlocking feature;
   an annular frictional element frictionally engaged with said at least one engagement element, wherein a first one of said first and second annular elements further comprises at least one second interlocking feature and is rotationally locked with said annular frictional element, wherein in a first rotational direction, said frictional engagement is arranged to urge said at least one engagement element to radially displace to rotationally connect with said first and second annular elements to apply torque from said second element to said at least one engagement element in a substantially circumferential direction and wherein in a second rotational direction, said frictional engagement is arranged to urge said at least one engagement element to radially displace such that said first and second annular elements are rotationally independent.

* * * * *